United States Patent
Pilegaard et al.

(10) Patent No.: US 11,644,352 B2
(45) Date of Patent: *May 9, 2023

(54) COMPACT ULTRASONIC FLOWMETER

(71) Applicant: Kamstrup A/S, Skanderborg (DK)

(72) Inventors: Lasse Pilegaard, Skanderborg (DK);
Anders Hedegaard, Skanderborg (DK);
Kaspar Raahede Aarøe, Skanderborg (DK)

(73) Assignee: Kamstrup A/S, Skanderborg (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/375,543

(22) Filed: Jul. 14, 2021

(65) Prior Publication Data

US 2021/0341323 A1 Nov. 4, 2021

Related U.S. Application Data

(63) Continuation of application No. 16/376,620, filed on Apr. 5, 2019, now Pat. No. 11,118,951.

(30) Foreign Application Priority Data

Apr. 5, 2018 (EP) ..................................... 18165942

(51) Int. Cl.
*G01F 1/667* (2022.01)
*G01F 1/66* (2022.01)

(52) U.S. Cl.
CPC .............. *G01F 1/667* (2013.01); *G01F 1/662* (2013.01)

(58) Field of Classification Search
None
See application file for complete search history.

(56) References Cited

U.S. PATENT DOCUMENTS

| 5,613,806 A | 3/1997 | House et al. |
| 5,966,010 A | 10/1999 | Loy et al. |

(Continued)

FOREIGN PATENT DOCUMENTS

| EP | 2083251 A1 | 7/2009 |
| EP | 2236995 A1 | 10/2010 |

(Continued)

OTHER PUBLICATIONS

Extended European Search Report dated Jun. 23, 2021, for related European Patent Application No. 21162601.5.

(Continued)

*Primary Examiner* — Justin N Olamit
(74) *Attorney, Agent, or Firm* — Renner, Otto, Boisselle & Sklar, LLP

(57) ABSTRACT

A compact ultrasonic flowmeter for measuring flowrate and other fluid related data includes a flow tube with a flow bore for passage of the fluid between an inlet and an outlet, a flowmeter housing associated with the flow tube, a printed circuit board arranged in the flowmeter housing and including a processor for controlling operations of the flowmeter, a meter circuit including ultrasonic transducers provided on the printed circuit board and configured for operating the ultrasonic transducers to transmit and receive ultrasonic wave packets through the fluid, a display mounted on the printed circuit board and configured for displaying a measured flowrate and the other fluid related data, one or more battery packs for powering flowmeter operations, and an antenna element configured to be connected to a radio circuit via connectors provided on the printed circuit board and/or the antenna element.

18 Claims, 6 Drawing Sheets

(56) References Cited

U.S. PATENT DOCUMENTS

| | | | |
|---|---|---|---|
| 7,634,950 B2 | 12/2009 | Rhodes | |
| 7,692,600 B1 * | 4/2010 | Pakosz | H01Q 1/2233 343/795 |
| 7,694,570 B1 | 4/2010 | Dam et al. | |
| 8,310,403 B2 * | 11/2012 | Nahar | G01D 4/002 361/679.01 |
| 8,893,559 B2 | 11/2014 | Drachmann | |
| 8,928,137 B2 | 1/2015 | Skallebæk et al. | |
| 9,175,994 B2 | 11/2015 | Ueberschlag et al. | |
| 9,671,264 B2 * | 6/2017 | Kashima | G01F 1/667 |
| 9,714,858 B2 * | 7/2017 | Laursen | G01F 15/06 |
| 10,112,017 B2 | 10/2018 | Mercer et al. | |
| 11,029,196 B2 | 6/2021 | Forster-Knight et al. | |
| 2013/0091945 A1 | 4/2013 | Renoud et al. | |
| 2014/0216167 A1 | 8/2014 | Nielsen et al. | |
| 2015/0276454 A1 | 10/2015 | Laursen et al. | |
| 2016/0305807 A1 * | 10/2016 | Drachmann | H05K 1/148 |

FOREIGN PATENT DOCUMENTS

| | | |
|---|---|---|
| EP | 2562517 A1 | 2/2013 |
| EP | 2602596 A1 | 6/2013 |
| WO | 2017163252 A1 | 9/2017 |

OTHER PUBLICATIONS

Extended European Search Report dated Jun. 24, 2021, for related European Patent Application No. 21162598.3.
Extended European Search Report dated Jul. 22, 2021, for related European Patent Application No. 21162606.4.
Extended European Search Report dated Jul. 22, 2021, for related European Patent Application No. 21162605.6.

* cited by examiner

COMPACT ULTRASONIC FLOWMETER

RELATED APPLICATIONS

This application is a continuation of U.S. application Ser. No. 16/376,620, filed Apr. 5, 2019, which claims priority to European Application No. 18165942.6, filed Apr. 5, 2018, both of which are incorporated herein by reference in their entireties.

FIELD OF THE INVENTION

The present invention relates to ultrasonic flowmeters for measuring flowrate and other fluid related data, the flowmeters comprising a flow tube and a flowmeter housing containing flowmeter components including a printed circuit board with surface components on one side.

BACKGROUND OF THE INVENTION

Electronic or steady state flowmeters, such as ultrasonic flowmeters, are increasingly being used as utility meters for measuring water consumption. Compared to traditional mechanical flowmeters, an ultrasonic flowmeter provides the advantage of having no moving parts. Another advantage is the electronic nature of ultrasonic flowmeters. As ultrasonic flowmeters include a power source for powering the measurement circuit, often a battery, a radio communication device for external communication may also be integrated. Furthermore, ultrasonic flowmeters often include onboard processing capabilities, making data processing available in the meter. With an increasing focus on environmental issues, including water scarcity, water metering is on the rise resulting in more metering points on a global scale. Additionally, advancements in sensor technology and data processing have made it possible to gather new types of data and to use that data for new purposes, such as leak detection, water quality assessments, etc., rather than just water consumption.

With an increasing number of metering points, water meter manufacturability becomes an important factor and even minor improvements may have a significant impact on the total cost of a metering infrastructure including tenth of thousands of meters. Hence, an improved more compact and manufacturing friendly ultrasonic flowmeter would be advantageous.

SUMMARY OF THE INVENTION

It is an object of the present invention to wholly or partly overcome disadvantages and drawbacks of the prior art. More specifically, it is an object to provide a compact and manufacturing friendly ultrasonic flowmeter.

Thus, the above described object and several other objects are intended to be obtained in a first embodiment of the invention by providing a compact ultrasonic flowmeter for measuring flowrate and other fluid related data, comprising: a flow tube with a flow bore for passage of the fluid between an inlet and an outlet; a flowmeter housing associated with the flow tube; a printed circuit board arranged in the flowmeter housing and including a processor for controlling operations of the flowmeter; a meter circuit including two or more ultrasonic transducers provided on the printed circuit board and configured for operating the ultrasonic transducers to transmit and receive ultrasonic wave packets through the fluid; a display mounted on the printed circuit board and configured for displaying a measured flowrate and other fluid related data; and one or more battery packs for powering flowmeter operations including at least the processor and the meter circuit and the display; wherein the processor and the ultrasonic transducers are surface mounted on a lower side of the printed circuit board and the display is mounted on an upper side of the printed circuit board.

By arranging surface mounted devices on one side of the printed circuit board and through hole components on the opposite side, an effective and reliable manufacturing process may be achieved. Additionally, by fitting electronic components associated with core flowmeter functionality onto one printed circuit board, a compact ultrasonic flowmeter is achievable.

In one embodiment, the flowmeter housing may be integrated with the flow tube, e.g. by being cast as a fully integrated monolithic component. Embodiments of the compact ultrasonic flowmeter may also be provided with a single printed circuit board wherein the processor and the ultrasonic transducers are surface mounted on a lower side of the single printed circuit board and the display is mounted on an upper side of the single printed circuit board.

By integrating the flowmeter housing with the flow tube and fitting all circuits and electronic components onto a single printed circuit board, a very compact and manufacturing friendly ultrasonic flowmeter is achieved. The compact ultrasonic flowmeter thus comprises only a single printed circuit board arranged in the flowmeter housing.

The ultrasonic flowmeter may further comprise a front plate provided with an opening for receiving a display, and the front plate may be arrange in flush with the display, such as 10-40 mm above the printed circuit board. Hereby the ultrasonic flowmeter is kept compact.

Additionally, the front plate may substantially cover the printed circuit board. Hereby the printed circuit board is shielded and protected by the front plate. The ultrasonic flowmeter described above may also comprise a container arranged on top of the printed circuit board, wherein the container is provided with a through-going opening 173 for receiving the display and configured to protect the printed circuit board and other components mounted thereon.

Moreover, the ultrasonic flowmeter may comprise a radio communication device mounted on the printed circuit board, wherein the radio communication device is electrically coupled to an antenna element via a radio circuit, and the antenna element is mounted on the container and releasably coupled to the radio circuit. Here, the antenna element may be mounted on a side face of the container.

Additionally, the radio communication device may be configured to detect whether it is electrically connected to the antenna element and the processor may be configured to determine that the container has been lifted above the printed circuit board based on input from the radio communication device, that the electrical connection to the antenna element has been disconnected.

The ability to determine whether the container has been lifted based on detection of the antenna element may provide a tamper detection functionality as the container and front plate shields and protects the printed circuit board including the metering circuit.

Further, the antenna element may be connected to the radio circuit via connectors provided on the printed circuit board and/or the antenna element. Also, the connectors and/or mating connector surfaces may be arranged on the printed circuit board along its periphery, corresponding to the position of the antenna element on the container. Such connectors may for example be of the spring contact connector type.

Additionally, the front plate may constitute a lid for the container and the container may contain a desiccant.

Furthermore, the ultrasonic transducers may be positioned on transducer areas provided on an outer surface of the flow tube, or on an upper surface of a bottom part of a separate flow meter housing mounted on a flow tube.

In one embodiment of the compact ultrasonic flowmeter described above, backing devices may be arranged on the printed circuit board opposite the transducers to providing a holding force pressing a lower side of the transducers against the transducer areas, i.e. the flow tube. Such backing devices may be mounted on top of the printed circuit board to apply the holding force to an area of the printed circuit board containing the ultrasonic transducers. The backing devices may comprise a backing element abutting the transducer and/or the printed circuit board and a restrained resilient member configured to provide the holding force. Furthermore, the backing device may include a bracket element arranged to displaceably receive the backing element and the resilient member in the form of a helical spring retained between the bracket element and the backing element. Additionally, a lower side of the ultrasonic transducers may be secured to the transducer areas by a non-hardening adhesive, such as a butyl containing adhesive.

Furthermore, the ultrasonic transducers may be mounted on islands provided in the printed circuit board being connected with the remaining printed circuit board via tongues of the printed circuit board containing copper traces for electrically connecting the ultrasonic transducers to the remaining meter circuit. Such design provides a certain resilience to the design and allows limited transducer displacement towards the flow tube.

Additionally, the ultrasonic flowmeter may be a utility meter for meter water consumption or a utility meter for metering fluid flow in a heat or cooling meter installation. The ultrasonic flowmeter described above may also additionally include a temperature probe for measuring the temperature of a fluid flowing through the flow tube.

Moreover, the ultrasonic flowmeter may be configured to include registers for storing meter data, such as flow-, volume- and/or consumption data. The ultrasonic flowmeter may also store other meter data, such as event- or performance data related to the operation of the meter or data related to other sensors (internal of external) connected to the meter.

The above described embodiments may each be combined with any of the other embodiments. These and other embodiments will be apparent from and elucidated with reference to the embodiments described hereinafter.

BRIEF DESCRIPTION OF THE FIGURES

The compact ultrasonic flowmeter according to the invention will now be described in more detail with regard to the accompanying figures. The figures show one way of implementing the present invention and is not to be construed as being limiting to other possible embodiments falling within the scope of the attached claim set.

DETAILED DESCRIPTION

Figure 1A:
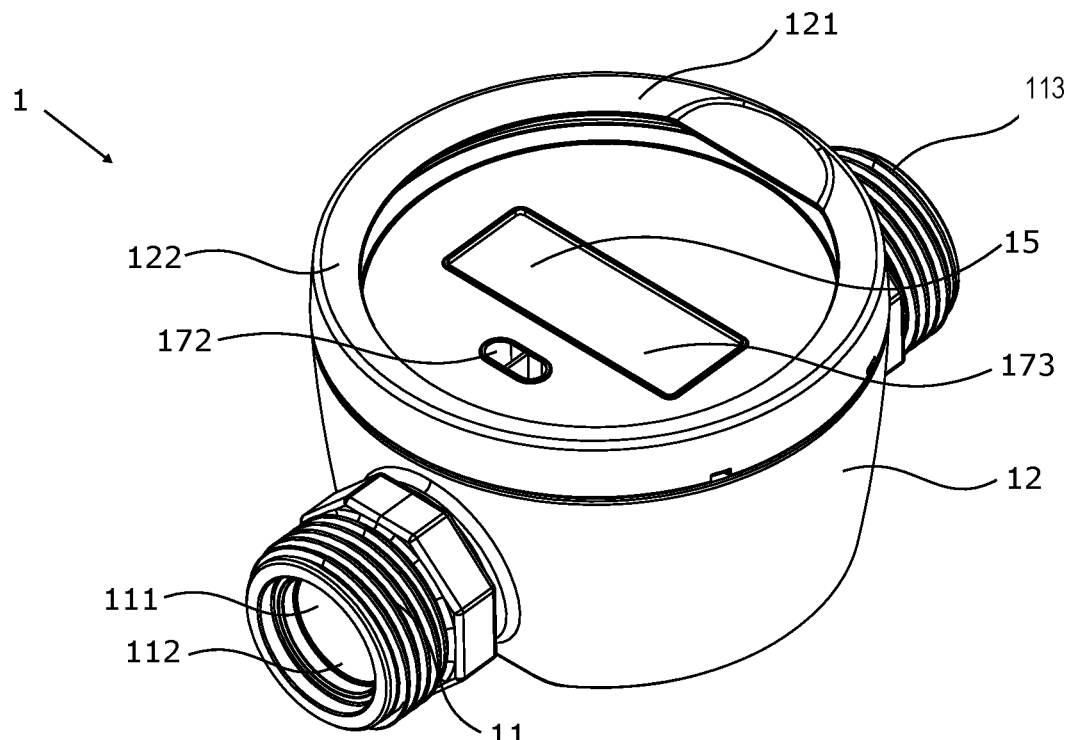
FIG. 1a shows a compact ultrasonic flowmeter.
Figure 1B:
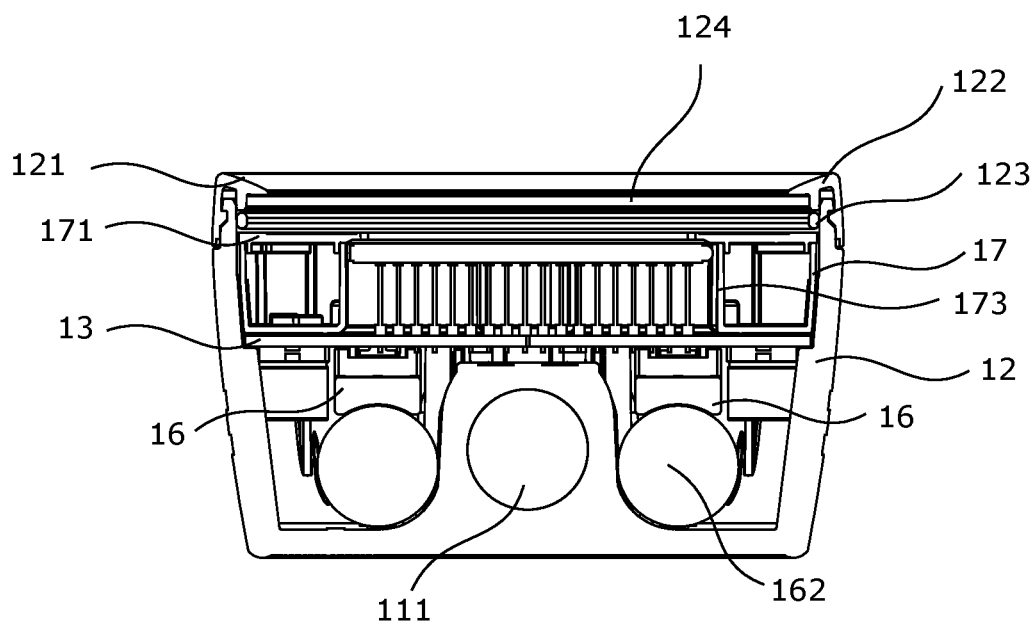
FIG. 1b shows a transversal cross-section of an ultrasonic flowmeter.
Figure 1C:
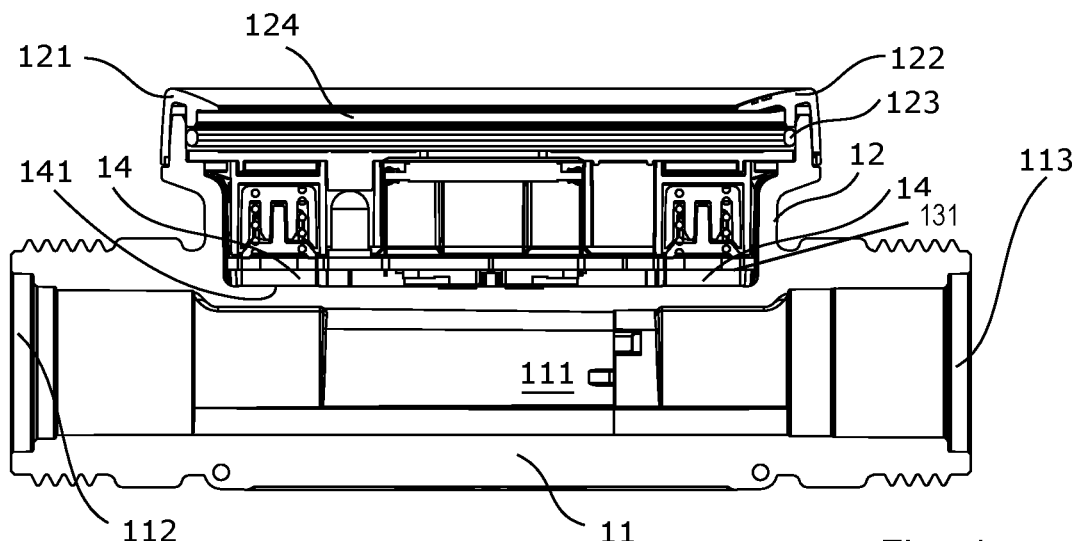
FIG. 1c shows a longitudinal cross-section of an ultrasonic flowmeter.

FIGS. 1a, 1b, and 1c illustrate a compact ultrasonic flowmeter 1 according to one embodiment of the invention. The flowmeter comprises a flow tube 11 with a flow bore 111 for passage of the fluid between an inlet 112 and an outlet 113. A flowmeter housing 12 is formed as an integrated part of the flow tube thereby providing a compartment for meter components arranged at the flow tube to measure the flow rate of a fluid flowing in the flow bore. The flowmeter housing is closed-off by a lid 121 constituted by a locking ring 122 and a transparent cover element 124. Between the lid and the flow meter housing a sealing element 123 is arranged to provide a hermetical seal.

Inside the flowmeter housing a printed circuit board (PCB) 13 including a processor 135 for controlling operations of the flowmeter is arranged. The PCB further includes a meter circuit (not shown) and two ultrasonic transducers 14 mounted on its lower side 131. A lower side 141 of the ultrasonic transducers opposite an upper side connected to the PCB, is arranged against an outer surface of the flow tube 11. The meter circuit is configured for operating the ultrasonic transducers to transmit and receive ultrasonic wave packets through the flow tube and a fluid present in the flow bore. On an upper side 132 of the PCB 13 a display 15, configured for displaying a measured flowrate and other fluid related data, is mounted. A socket connector 155 and a set of diodes 156 configured for infra-red communications are also provide on an upper side of the PCB.

Figure 7:
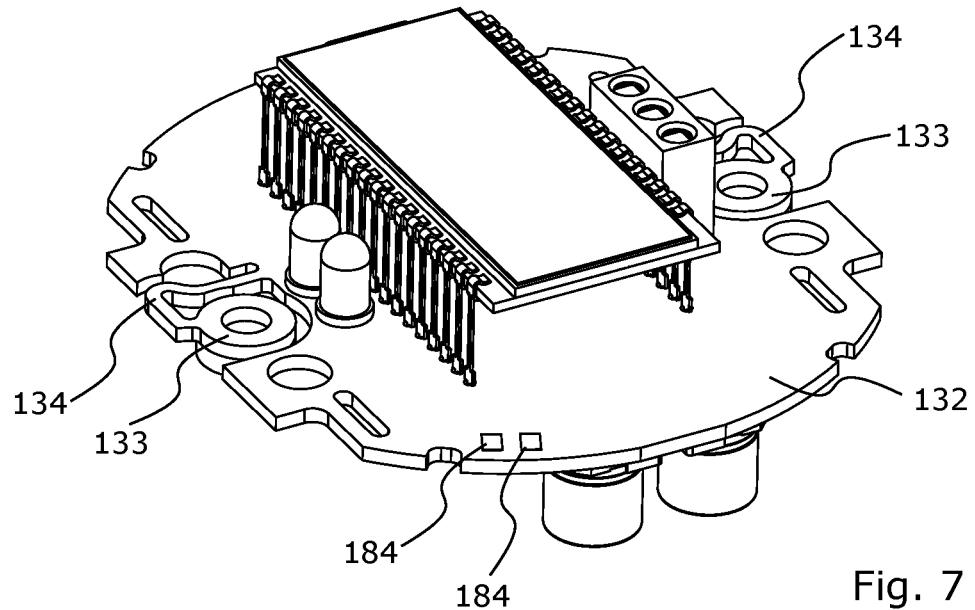
FIG. 7 shows an upper side of a printed circuit board of a compact ultrasonic flowmeter.
Figure 8:
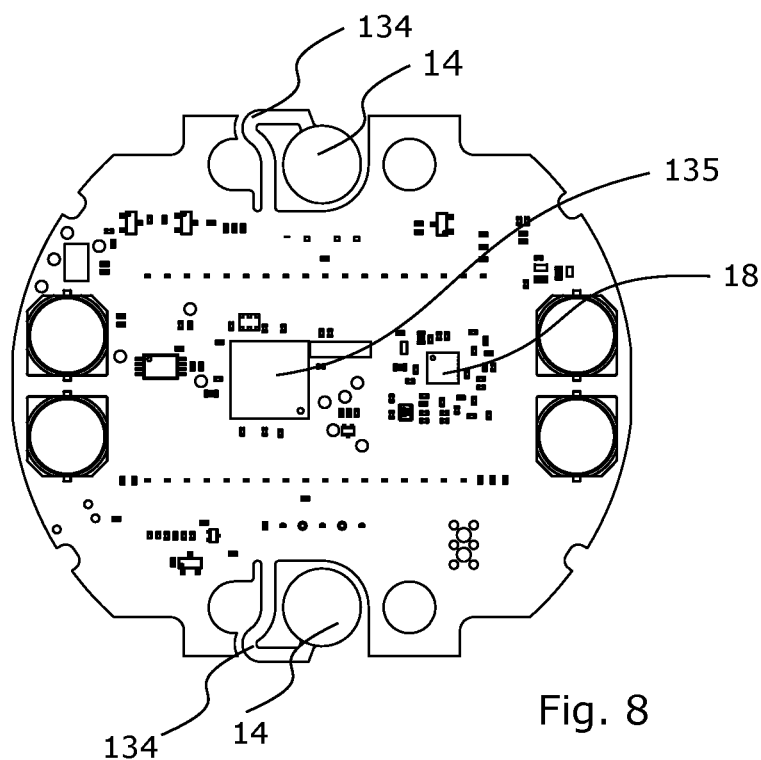
FIG. 8 shows a lower side of a printed circuit board of a compact ultrasonic flowmeter.
Figure 9:
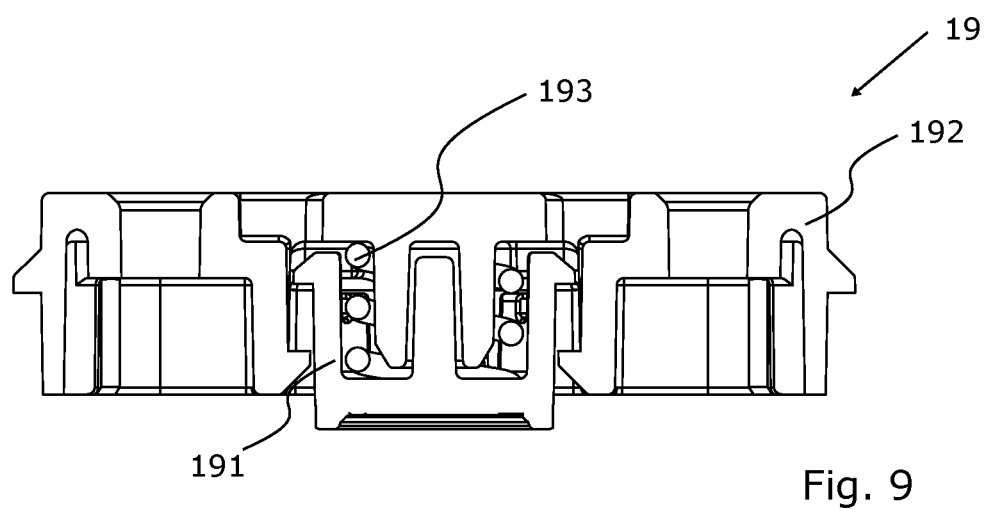
FIG. 9 shows a cross-section of a transducer backing device.

Referring to FIGS. 7 and 8, the lower side of the PCB contains the surface mounted devices (SMDs), such as the piezoelectric ultrasonic transducers 14 and the processor 135, and the upper side of the PCB contains through hole components mounted by a selective soldering process. The upper side components, including the display, are provided with pins 151 which are arranged in through holes in the printed circuit board and selective soldered on the lower side of the PCB. By mounting SMDs on one side only, an effective and reliable manufacturing process may be achieved. Additionally, by mounting the through hole components on the upper side 132 and soldering these on the lower side, the manufacturing process may be further improved. However, the selective soldering process associated with the through hole components requires a certain spacing between SMDs and areas of the PCB in which selective soldering is used.

Figure 3B:
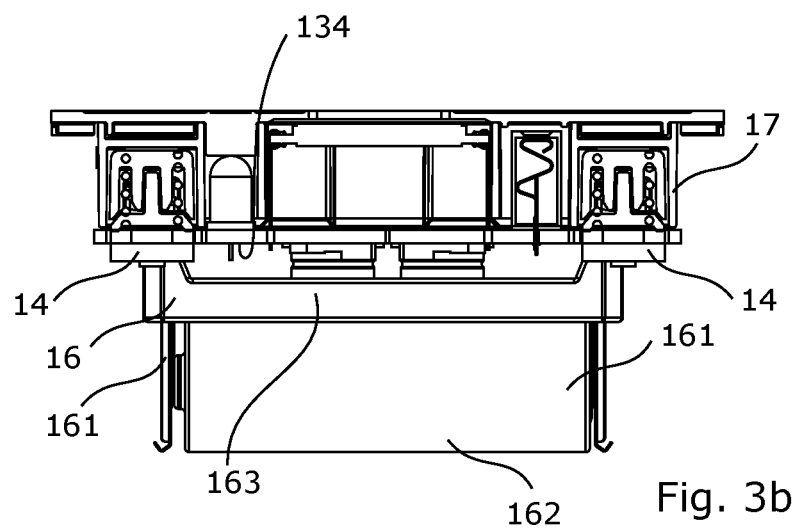
FIG. 3b shows a longitudinal cross-section of the insides of the compact ultrasonic flowmeter.
Figure 4:
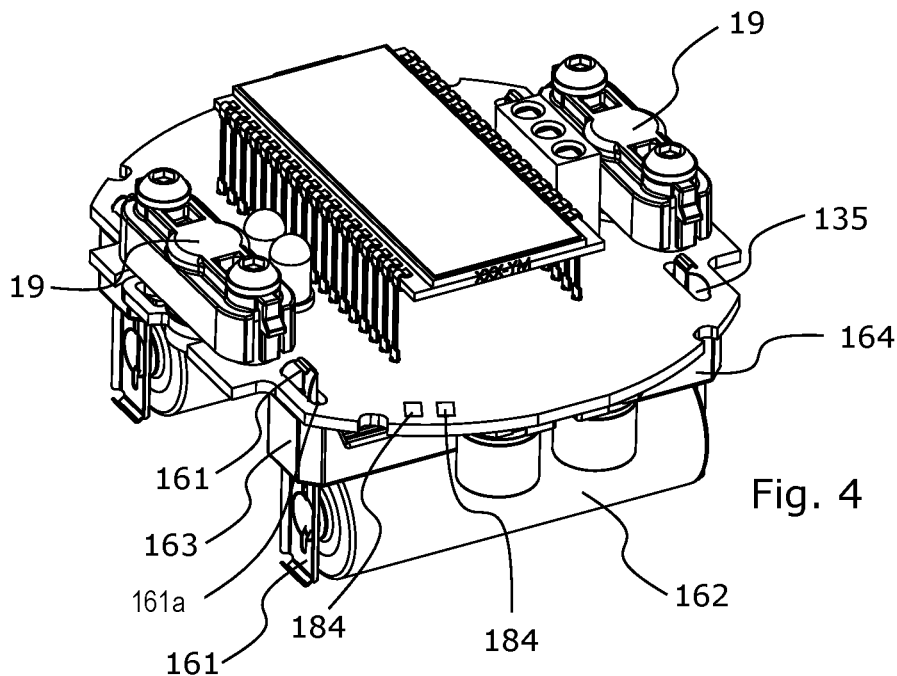
FIG. 4 shows a printed circuit board of a compact ultrasonic flowmeter.

The flowmeter shown in FIG. 1a-1c further includes two battery packs 16 for powering flowmeter operations including the processor, the meter circuit and the display. In alternative embodiments fewer or more battery packs may also be used. To effectuate a compact and handy design suitable for automated mass production, the battery packs are mounted directly on the PCB by battery pins 161 extending through plated through holes 161a in the PCB as shown in FIG. 3b and FIG. 4. The battery pins are compliant pins that are deformed upon insertion into the plated through holes. The deformation of the battery pins ensure the necessary electrical contact between the pin and the PCB copper traces and secures the battery pact to the PCB. In the shown embodiment, the battery cells 162 are mounted in battery holders 163 including the battery pins. However, in alternative embodiments the battery pins may be fixed directly to the poles of the battery cells, e.g. by welding. Each of the battery holders comprises a rigid element 164 provided with two battery pins in opposite ends. A battery cell may be fixated between the pins as a sub-assembly, which subsequently can be mounted on a PCB.

As seen from FIG. 1a-c, the battery packs are mounted on the lower side of the PCB and extend in a longitudinal direction of the flowmeter along the flow tube. With the PCB mounted in the housing, the battery packs are arranged on opposite sides of the flow tube providing a compact design. By arranging the batteries underneath the PCB, the space inside the housing is fully utilized. Further, the batteries are supported on a bottom face of the housing thereby maintaining the battery pins in the plated through holes 161a.

The ultrasonic flowmeter further comprising a radio communication device 18 mounted on the lower side of the printed circuit board. The radio communication device is connected to a radio circuit implemented on the PCB. Via the radio circuit the communication device is electrically coupled to an antenna element 181 as will be further explained below. The radio communication device serves to transmit meter data via radio frequency communication to a back end- or head end system (HES) wherein meter data is stored and processed, such as for billing purposes. The radio communication device may provide both one-way and two-way communication between the flowmeter and head end system. Automated meter reading (AMR) advanced meter infrastructure (AMI) systems are commonly known for communicating with utility meters. In an AMI a communication path is established between the utility meter and the HES via a number of intermediate network devices such as data collectors, repeaters, routers gateways etc. The utility meters may deliver any data obtained by the meter or external sensors connected to it to the HES, however the capacity of the AMI and the battery capacity of the utility meters M will limit the amount of data that can be transmitted. The AMI may use any suitable technology for carrying data from the utility meter to the HES over one or more local area networks or wide area networks including connections to the open internet. The AMI may use any suitable wireless technology (e.g. wireless M-Bus, Narrow band IoT, SigFox, any cellular technologies or proprietary communication protocols) or any wired communication technologies (e.g. wired M-Bus, LON, Ethernet).

Still referring to FIG. 1a-1c, a container 17 is provided on top of the PCB. The container comprises a compartment for containing a desiccant and the front plate 171 constitutes a lid for the container as seen from FIGS. 5 and 6. The desiccant ensures that moisture penetrating into the flowmeter housing, such as water molecules penetrating through its wall, are absorbed and thus does not negatively affect components arranged in the housing. The container further serves to protect or shield the PCB and components mounted thereon. As seen, only the display and diodes are visible as these are received in through-going openings 172, 173 provided in the container and the front plate. In an alternative embodiment no components or only the display may be received in openings in the container.

Figure 3A:
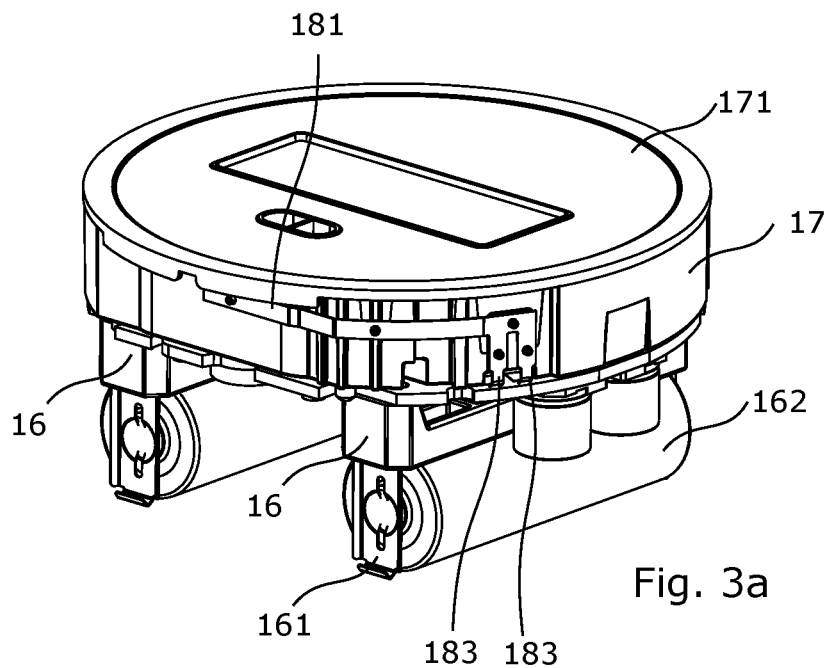
FIG. 3a shows the insides of the compact ultrasonic flowmeter.
Figure 5:
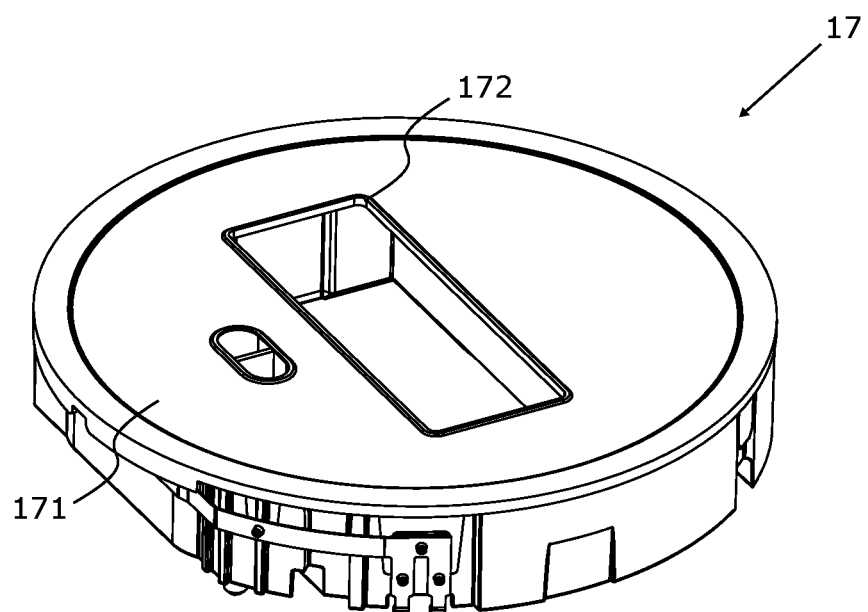
FIG. 5 shows a desiccant container including a front plate.
Figure 6:
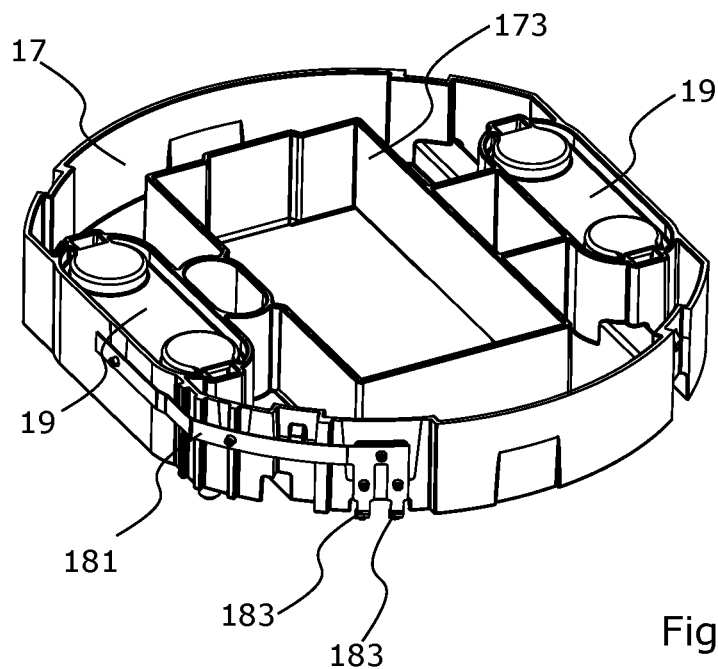
FIG. 6 shows a desiccant container without a front plate.

As seen from FIGS. 3a and 5, the container further includes an antenna element 181 mounted on its circumferential side face. In the shown embodiment, the antenna element is a piece of conducting material, such as a stamped out piece of metal, shaped to follow the outer contour of the container. In an alternative embodiment, the antenna element could be a patch antenna or a trace deposited directly on the side of the container. The antenna element 181 is connected to the radio circuit on the PCB via connectors 183. The connectors engage with mating connector surfaces 184 arranged on the PCB, seen in FIG. 4.

The container and antenna element thus constitute an independent subassembly that may be manufactured and mounted in the housing during the final assembly of the flowmeter. Arranging the container on top of the PCB serves to protect the PCB and components mounted thereon. Further, a compact design is achieved as the container is designed to encompass components extending from the PCB. Also, the container serves to position the front plate 10-40 mm above the printed circuit board.

The radio communication device is configured to detect whether an electrical connection exists between the antenna element and its connectors 183 and the radio circuit. Based on input from the radio communication device, the meter processor 135 may thus determine whether the antenna element is connected to the radio circuit. Based on this determination, the processor may determine whether the container including the antenna element is properly mounted on top of the PCB or whether the container has been lifted above the PCB. Lifting of the container, i.e. disconnection of the antenna element, may indicate a tampering event or other unauthorized access to the meter electronics. If the processor determines that the antenna has been disconnected, the processor may store the event in a logger of the flowmeter and effectuate transmission, via the radio communication device, of an alarm or other information indicating a that a potential tampering event has taken place. The container subassembly thus also serves as a tamper detecting element designed to protect meter electronics and to warn about possible tampering.

As described above with reference to FIG. 1c, a lower side 141 of the ultrasonic transducers are arranged against an outer surface of the flow tube 11. The area of the flow tube receiving the transducers may be dedicated transducer areas wherein the thickness of the flow tube may be controlled to match the characteristics of the transducers. In alternative embodiments wherein the flowmeter housing constituted by a separate entity mounted on a flow tube (not shown), the transducers may be arranged against transducer areas provided on an upper or inside surface of a bottom part of the flow meter housing arranged to be in contact with a flowing medium in the flow tube, i.e. constituting part of the flow tube.

Figure 2:
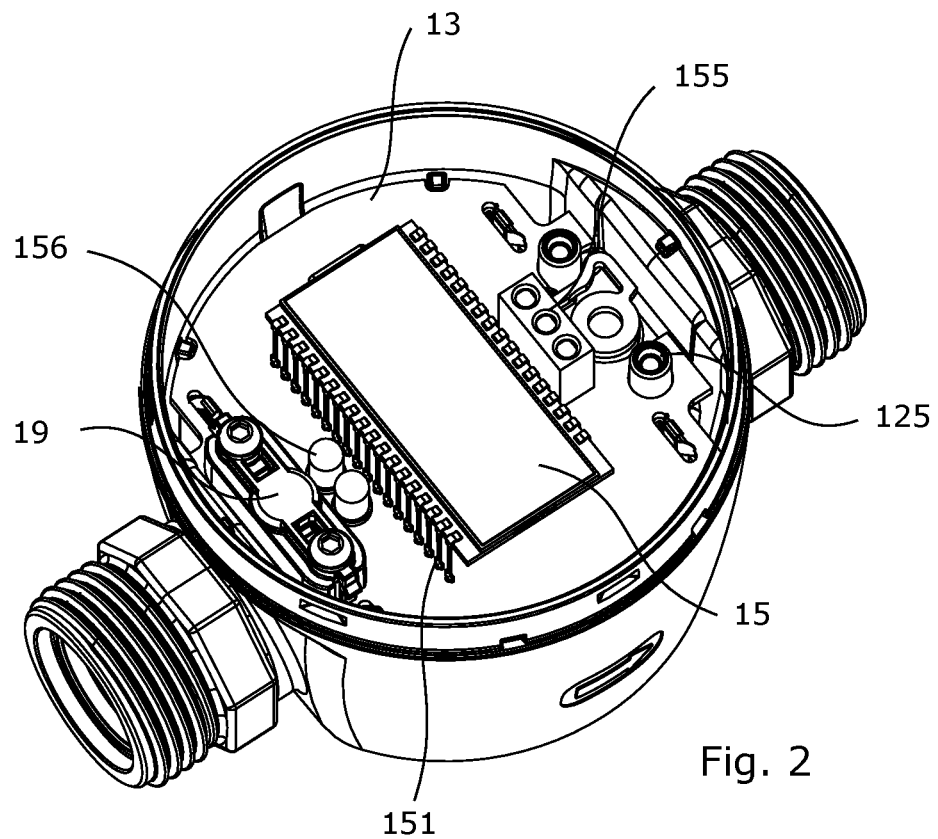
FIG. 2 shows a compact ultrasonic flowmeter with an open flowmeter housing.

Referring to FIG. 2 and FIG. 4, backing devices 19 are arranged on the PCB opposite the transducers. The backing devices are arranged to provide a holding force to the area of the PCB containing the ultrasonic transducers, thereby pressing the lower side of the transducers against the transducer areas, i.e. the flow tube. In FIG. 2, only one of two backing devices is shown to illustrate how the backing devices are mounted on mounting structures 125 extending from and integrated with the flow tube. By mounting the backing device directly to the flow tube, sufficient holding force may be obtained to keep the transducers in place for the duration of the lifetime of the meter. Each of the backing devices comprises a bracket element 192 fixed to the mounting structures and spring biased backing element 191 movable in a bore of the bracket element. A helical spring 193 is retained between the bracket element and the backing element providing the holding force. In the shown embodiment, the bracket element is fixed to the flow tube by screws but other fixing means may also be used, such as snap-mechanisms, etc.

Alternatively, the backing devices may be comprised by a resilient member secured to the mounting structure and an associated backing element abutting the printed circuit board. The resilient member may be a leaf spring or a piece of polymer or rubber material having a certain resilience.

Furthermore, a lower side of the ultrasonic transducers are secured to the transducer areas by a non-hardening adhesive, such as a butyl containing adhesive. The adhesive connects the transducers to the flow tube thereby improving the transfer of vibrations between the transducers and a fluid in the flow bore. The combined use of a backing device and a non-hardening adhesive ensure a durable construction wherein sufficient contact between the transducers and the flow tube is maintained for extended periods of operation. Good vibration- or signal transfer between the transducers and the fluid is important for the signal quality and may thus affect flow measurements.

As seen from FIG. 7 and FIG. 8 the ultrasonic transducers may additionally be mounted on displaceable islands 133 provided in the printed circuit board. The islands are connected with the remaining printed circuit board via tongues 134 of PCB containing providing a certain resilience. Hereby the part of the PCB containing the transducers may be displaced towards the flow tube to ensure good contact between the flow tube and the transducers. The resilience provided by the tongues also isolates the reminder of the PCB from transducer vibrations. Further, copper traces are provided on the PCB tongues to connect the transducers to the remaining meter circuit.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A compact ultrasonic flowmeter for measuring flowrate and other fluid related data, comprising:
    a flow tube with a flow bore for passage of the fluid between an inlet and an outlet;
    a flowmeter housing associated with the flow tube;
    a single printed circuit board arranged in the flowmeter housing and including a processor for controlling operations of the flowmeter;
    a meter circuit including two or more ultrasonic transducers provided on the printed circuit board and configured for operating the two or more ultrasonic transducers to transmit and receive ultrasonic wave packets through the fluid;
    a display mounted on the printed circuit board and configured for displaying a measured flowrate and the other fluid related data, the processor and the two or more ultrasonic transducers being surface mounted on a lower side of the printed circuit board and the display being mounted on an upper side of the printed circuit board;
    one or more battery packs for powering flowmeter operations including at least the processor and the meter circuit and the display;
    a container arranged between the printed circuit board and a lid of the flowmeter, wherein the container encompasses components extending from the printed circuit board; and
    an antenna element mounted on the container and configured to be connected to a radio circuit via connectors provided on the printed circuit board and/or the antenna element.

2. The compact ultrasonic flowmeter according to claim 1 further comprising a radio communication device that is mounted on the lower side of the printed circuit board and is connected to the radio circuit implemented on the printed circuit board.

3. The compact ultrasonic flowmeter according to claim 2, wherein the radio communication device is electrically coupled to the antenna element via the radio circuit, wherein the antenna element is releasably coupled to the radio circuit.

4. The compact ultrasonic flowmeter according to claim 3, wherein the connectors and/or mating connector surfaces are arranged on the printed circuit board along a periphery thereof, corresponding to a position of the antenna element on the container.

5. The compact ultrasonic flowmeter according to claim 2, wherein the radio communication device is configured to detect whether an electrical connection exists between the antenna element and the connectors and the radio circuit.

6. The compact ultrasonic flowmeter according to claim 1, wherein the antenna element is mounted on a side face of the container.

7. The compact ultrasonic flowmeter according to claim 6, wherein the antenna element is mounted on the circumferential side of the container.

8. The compact ultrasonic flowmeter according to claim 1, wherein the antenna element is a patch antenna or a trace deposited directly on a side of the container.

9. The compact ultrasonic flowmeter according to claim 1, wherein the flowmeter housing is integrated with the flow tube.

10. A compact ultrasonic flowmeter for measuring flowrate and other fluid related data, comprising:
    a flow tube with a flow bore for passage of the fluid between an inlet and an outlet;
    a flowmeter housing associated with the flow tube;
    a single printed circuit board arranged in the flowmeter housing and including a processor for controlling operations of the flowmeter;
    a meter circuit including two or more ultrasonic transducers provided on the printed circuit board and configured for operating the two or more ultrasonic transducers to transmit and receive ultrasonic wave packets through the fluid;
    a display mounted on the printed circuit board and configured for displaying a measured flowrate and other fluid related data, the processor and the ultrasonic transducers being surface mounted on a lower side of the printed circuit board and the display being mounted on an upper side of the printed circuit board;

one or more battery packs for powering flowmeter operations including at least the processor and the meter circuit and the display;

a container arranged between the printed circuit board and a lid of the flowmeter, wherein the container encompasses components extending from the printed circuit board; and a radio communication device mounted on the printed circuit board, the radio communication device being electrically coupled to an antenna element via a radio circuit, wherein the antenna element is mounted on the container and releasably coupled to the radio circuit.

11. The compact ultrasonic flowmeter according to claim 10, wherein the radio communication device is configured to detect whether an electrical connection exists between the radio communication device and the antenna element and the processor is configured to determine whether the container has been lifted above the printed circuit board based on an input from the radio communication device that the electrical connection to the antenna element has been disconnected.

12. The compact ultrasonic flowmeter according to claim 10, wherein the antenna element is connected to the radio circuit via connectors provided on the printed circuit board and/or the antenna element.

13. The compact ultrasonic flowmeter according to claim 12, wherein the connectors and/or mating connector surfaces are arranged on the printed circuit board along a periphery thereof, corresponding to a position of the antenna element on the container.

14. The compact ultrasonic flowmeter according to claim 12, wherein the radio communication device is configured to detect whether an electrical connection exists between the antenna element and the connectors and the radio circuit.

15. The compact ultrasonic flowmeter according to claim 10, wherein the antenna element is mounted on a side face of the container.

16. The compact ultrasonic flowmeter according to claim 10, wherein the radio communication device is mounted on the lower side of the printed circuit board and is connected to the radio circuit implemented on the printed circuit board.

17. The compact ultrasonic flowmeter according to claim 10, wherein the flowmeter housing is integrated with the flow tube.

18. A compact ultrasonic flowmeter for measuring flowrate and other fluid related data, comprising:

a flow tube with a flow bore for passage of the fluid between an inlet and an outlet;

a flowmeter housing associated with the flow tube;

a single printed circuit board arranged in the flowmeter housing and including a processor for controlling operations of the flowmeter;

a meter circuit including two or more ultrasonic transducers provided on the printed circuit board and configured for operating the two or more ultrasonic transducers to transmit and receive ultrasonic wave packets through the fluid;

a display mounted on the printed circuit board and configured for displaying a measured flowrate and other fluid related data, the processor and the ultrasonic transducers being surface mounted on a lower side of the printed circuit board and the display being mounted on an upper side of the printed circuit board;

one or more battery packs for powering flowmeter operations including at least the processor and the meter circuit and the display;

a radio communication device mounted on the printed circuit board;

a container arranged between the printed circuit board and a lid of the flowmeter, wherein the container encompasses components extending from the printed circuit board; and an antenna element mounted on the container and configured to be connected to a radio circuit, wherein the radio communication device is electrically coupled to the antenna element via the radio circuit.

* * * * *